United States Patent [19]

Ohmann et al.

[11] 3,725,900

[45] Apr. 3, 1973

[54] METHOD AND APARATUS FOR THE PRODUCTION OF CHARACTERS AT WILL ON THE PICTURE SCREEN OF A CATHODE RAY TUBE AND/OR ON RECORD PAPER

[75] Inventors: Friedrich Ohmann; Rudolf Otto; Wolfgang Wiedenmann, all of Munich, Germany

[73] Assignee: Siemens Aktiengesellschaft, Berlin, Germany

[22] Filed: Mar. 10, 1971

[21] Appl. No.: 122,679

[30] Foreign Application Priority Data

Feb. 22, 1971 Germany....................P 20 62 546.1

[52] U.S. Cl. ...........340/324 A, 178/6.6 R, 178/30, 340/324 R, 346/75

[51] Int. Cl. ..............................................G08b 5/36

[58] Field of Search ....340/324 R, 324 A; 178/6.6 R, 178/30; 346/75

[56] References Cited

UNITED STATES PATENTS

| | | | |
|---|---|---|---|
| 3,510,878 | 5/1970 | Johnson | 346/75 X |
| 3,488,664 | 1/1970 | Winston | 346/75 |
| 3,484,794 | 12/1969 | Winston | 346/75 |
| 3,465,350 | 9/1969 | Keur et al. | 346/75 |
| 3,462,739 | 8/1969 | Scantlin | 340/154 |
| 2,916,727 | 12/1959 | Jones | 178/6.6 R X |

*Primary Examiner*—David L. Trafton
*Attorney*—Hill, Sherman, Meroni, Gross & Simpson

[57] ABSTRACT

A method and apparatus for representation of characters from signals emitted from a writing signal source, such as a keyboard, data processing installation, card scanner or the like, at will on the picture screen of a cathode ray tube and/or on record paper or a similar data carrier, wherein an image generator is employed to produce data signals for controlling the electron beam on the picture screen of a cathode ray tube, means are provided for deriving from these signals deflecting and/or blanking signals for a record printer, the printer preferably being an ink jet printer.

1 Claim, 3 Drawing Figures

METHOD AND APARATUS FOR THE PRODUCTION OF CHARACTERS AT WILL ON THE PICTURE SCREEN OF A CATHODE RAY TUBE AND/OR ON RECORD PAPER

BACKGROUND OF THE INVENTION

1. Field of the Invention

This invention relates to a method and apparatus for the reproduction of characters represented by signals from a writing source, such as a keyboard, a data process installation, a card scanner or the like, on the picture screen of a cathode ray tube and/or on record paper or a similar data carrier.

2. Description of the Prior Art

Large amounts of data may undergo a rapid visual survey through the provision of the data in visual form at a data viewing station. The data viewing stations can be utilized for any kind of dialogue communication between a man and a data processing installation. The typical possibilities for use of data viewing stations are, for example, information systems such as those employed in travel bureaus, airlines reservations systems and mail order houses, as well as in bookkeeping systems and card files. In all practical applications of the data viewing devices as remote data processing stations for data input and output, a problem arises in recording all or a part of the illustrated data.

In order to make a record of the data shown on the image screen of the data viewing device, it is a well known practice to photograph the picture screen. This process is, however, expensive and complicated in operation and has in addition the disadvantage that the recorded data are not immediately available.

Techniques for printing out the shown data mechanically is also known in the art. However, such systems are relatively expensive if they are to operate at high speeds and have the attendant disadvantage of producing printing noise.

SUMMARY OF THE INVENTION

The primary object of the present invention therefore, is to provide a method and apparatus for recording the data shown on a picture screen rapidly and noiselessly and at a minimum expense.

The foregoing objective is realized according to the invention by the provision of apparatus for deriving the deflection and/or blanking signals for a record printer, preferably an ink jet printer, from signals which ordinarily serve to control the electron beam on the picture screen of the cathode ray tube. The beam control signals are generated by an image generator of a data viewing apparatus in response to signals received from an input device, such as a keyboard, or other peripheral input apparatus.

According to a further development of the method of the invention, it is provided that digital signals which characterize the values allocated to the characters to be represented on the picture screen of a cathode ray tube are supplied by way of digital-analogue converters in the form of holding and acceleration voltages to the deflection plates of an ink jet printer of a type known per se, together with the signals for light or dark control. This is accomplished in such a way that on a data carrier the script characters appear through ink droplets emerging successively at brief time intervals from a nozzle and accelerated by a high voltage in the direction of the data carrier to be inscribed. These droplets are deflected by the voltages applied to the deflecting plates and appear on the record as straight lines.

According to a further development of the method of the instant invention, it is provided that in the printing operation the coded characters are dispensed synchronously from an image repeating memory and fed to a synchronous register of the image generator.

The process provides, according to another further development of the invention, that for the printing operation the coded characters are fed to the synchronous register of the image generator at a slower speed and are there further processed at the speed of the slower printer time.

In order to avoid the uncertainty in the time sequence of the characters as a result of the access time (delay line) of the transit time memory, the process of the invention further provides that during the time during which the character generator transmits to the printer the deflection voltages of the characters to be represented, the following character is written into a synchronous register which acts as a buffer store of the image generator.

The process of the invention is, according to a preferred form of execution, further characterized in that the transfer of the character from the synchronous register into the address register of the fixed-value (read only) memory, the selection of the coordinates from the fixed-value memory and the switching forward of the beam position counter take place with the same signal sequence as in normal data during apparatus operation, but at the slower printing speed.

It is further and most advantageously provided that during printing the stages of the beam position counter, whose states are characterized by the position of the electron beam on the picture screen, are preset at a constant value, so that the character that is just being printed is shown in the middle of the picture screen.

Advantageously such a procedure is then followed to then generate the holding voltage for the control of the ink jet printer wherein the stages of the beam position counter are evaluated by digital-analog converter means, the state being characterized by the position of the electron beam within a character background raster.

The character position of the record (data carrier) is established by a mechanical movement of the writing head and by the advance of the paper through the writer.

In one form of execution of the invention, it is further provided that each character is written in such a direction of movement that a minimum of character elements is dark-scanned. A better graphic image can further be achieved by providing that the fixed-value memory of the image generator deliver an additional bit per character element, which it serves in the printing operation for light-dark control of the ink jet.

An arrangement for carrying out the described process according to the invention can be constructed with little expenditure by providing that, besides the data viewing station which includes means for data input, viewing apparatus control, transit time memory with transit time memory control, image generator and picture screen, a device for adapting thereto an ink jet printer, which device comprises a switch for transferring from synchronous to a synchronous input of the coding characters into the synchronous register of the generator, another switch for the transfer from rapid viewing apparatus speeds to a lower printing speed generated in a pulse generator, and means for deriving of the motor speed for the drive of the writing carriage from the synchronous counter state of the transit time memory control.

In order that the amplifier circuits of the data viewing apparatus will not be excessively overloaded, the present invention provides that a constructional realization thereof includes a switch for turning off the acceleration pulses during the printing operation of the digital-analog converter means of the viewing apparatus.

The advantages achieved with the invention reside especially in that with the least expenditure, since all devices already present in the data apparatus for the character generation are utilized, there is now possible a rapid and at the same time noiseless recording of the data shown alpha-numerically on a picture screen.

BRIEF DESCRIPTION OF THE DRAWINGS

Other objects, features and advantages of the invention, its organization, construction and operation will be best understood from the following detailed description of an exemplary embodiment thereof taken in conjunction with the accompanying drawings, in which.

DESCRIPTION OF THE PREFERRED EMBODIMENT

The method and apparatus of the invention are described herein in association with a data viewing device which is per se well known in the art. The invention can always be used, however, when the alpha-numeric characters, for example, represented on a picture screen of a data viewing device, are to be recorded on a more permanent record.

Figure 1:
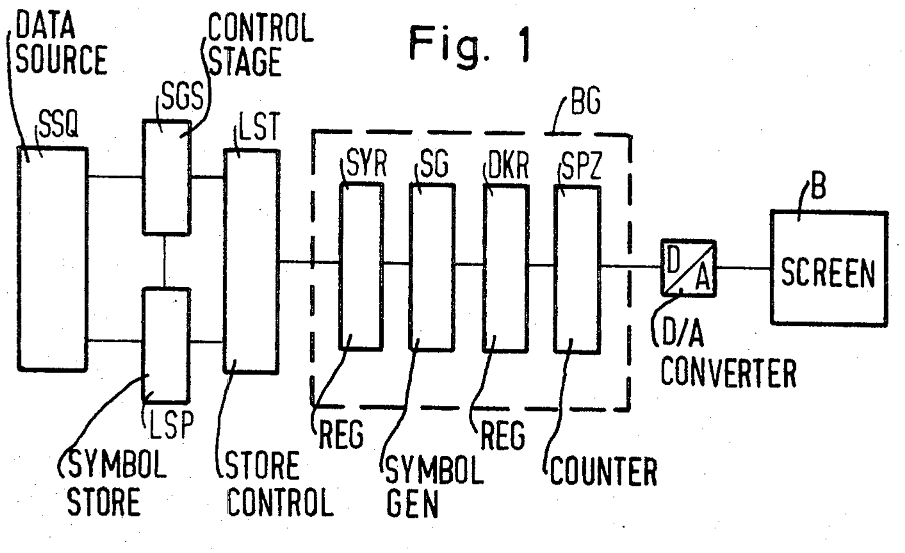
FIG. 1 illustrates a circuit diagram of a data viewing apparatus of the type generally known in the art.

A data viewing station consists, as already proposed in the art and represented in FIG. 1, of a viewing apparatus control SGS, an image repeating memory LSP (transit time memory) of the transit time memory control LSP, an image generator BG and an indicating screen B. The characters to be represented, coded by a writing signal source SSQ, for example a keyboard, data processing installation, card scanner or the like, are supplied to a control image repeating memory LSP, from which the characters within are successively fed in correspondence to the image change frequency repeatedly to the image generator BG. The image generator BG delivers the magnitudes of the beam movement allocated to the individual characters as digital signals which are fed by way of digital-analog converter means D/A in the form of accelerating voltages together with the return signals to the deflecting coils of a television picture tube B in the viewing apparatus. The viewing device control SGS coordinates the exchange of data and messages between the transit time memory LSP and the writing signal sources SSQ. The transit time memory control LST is the connecting member between the viewing apparatus control SGS and the image generator BG. It controls the synchronous data input or data output of the transit time memory LSP. The characters are transferred to the image generator BG over the synchronous output of the transit time memory LSP. In order to make it possible to represent alpha-numeric characters or special characters on a picture screen, corresponding signals must be supplied to the deflecting amplifiers and to the brightness control. These signals are generated in the image generator BG and are dependent upon the selected writing process. In the present example it is a matter of a writing process in which the characters are constructed in a straight line. Characters are composed of straight lines and each line or stroke is written by a movement of the electron beam from the particular starting point to the goal point. The position of the goal point is given in XY coordinates which are referred to the particular starting points. These coordinates are called difference coordinates in the following discussion. The characters are written through an arraying of suitable lines. The beam is guided from the starting point of the character in correspondence to the difference coordinates in the form of the character and scanned right in the corresponding places. The last difference coordinates moves the beam to the beginning of the next character.

The synchronous register SYR receives the binary coded character bits serially from the transit time memory control LST and transfers it with a message to the address register of a symbol generator SG. The symbol generator generates the difference coordinates necessary for writing of the character from the binary coded character. A difference coordinate consists of nine information bits and two control bits. For writing a character, depending on its form, many difference coordinates are required. The difference coordinates are stored in a fixed value memory of the symbol generator SG. The difference coordinate register DKR comprises an X-register with sign (plus or minus) and a Y-register with sign and a light-dark stage. A beam position counter SPZ for the X direction at the Y direction is connected to the output side of the difference coordinate register DKR. The stage of the position counter SPZ indicates the position of the electron beam on the picture screen, and in each case in the system the first three stages of the position counter SPZ characterizes the portion of the beam inside the fine raster in which the character is written, the character being composed of straight lines.

An ink jet printer 9, known per se, and represented in FIG. 2, operates in the following manner. A writing head 4 moves at a constant speed parallel to the writing line and dispenses an ink jet 11 which is resolved into droplets which are electrostatically deflected. The writing head 4 comprises a cylindrical metal envelope, a nozzle 3 fed with ink and four deflecting plates 7, which deflecting plates lie in pairs opposite one another symmetrically with respect to the longitudinal axis of the nozzle 3. An axial electric field is created between the ink and the passage opening of the nozzle 3. The charged ink droplets are accelerated in the axial electric field toward a data carrier, here a paper 10. The electric fields parallel to the axis, which are established by a potential difference on the deflecting plates 7, deflect the charged ink droplets 11. Therefore, if a suitable variable voltage is placed on the deflecting plates 7, any alpha-numeric character can be written on the paper 10.

Figure 2:
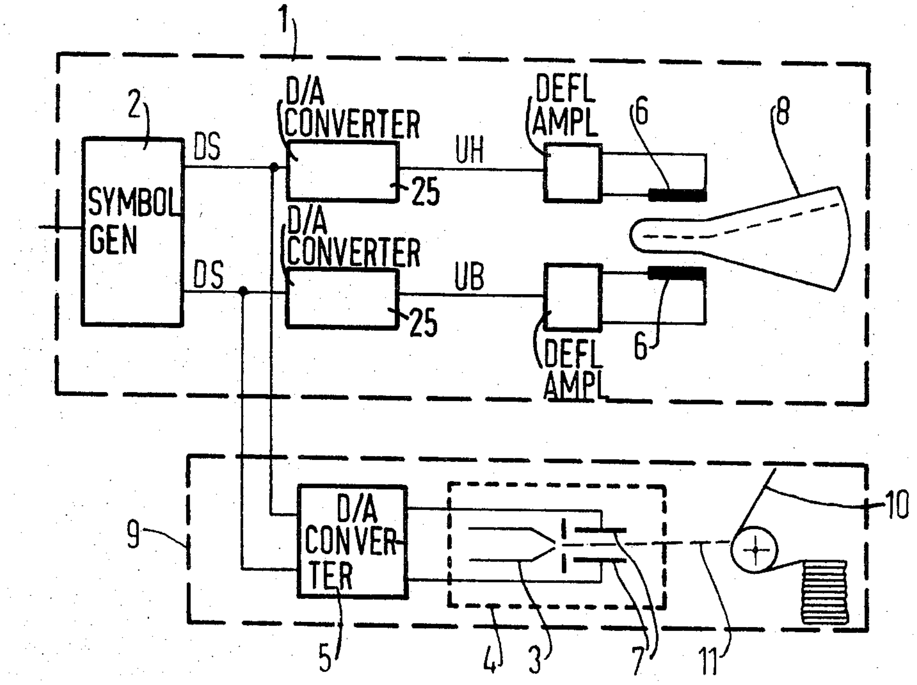
FIG. 2 illustrates a block circuit diagram of apparatus for controlling an ink jet printer according to the principles of the present invention.

As is symbolically illustrated in FIG. 2, digital signals DS are generated in an image generator 2 of a data viewing apparatus 1. These digital signals characterize the magnitudes of movement of the electron beam allocated to the characters to be represented on the picture screen of a data viewing device and are supplied by way of digital-analog converters 25 in the form of holding and acceleration voltages UH, UB to a pair of deflecting coils 6 of the television picture tube 8. These digital signals DS are simultaneously supplied by way of a digital-analog converter 5 to the deflecting plates 7 of the ink jet printer 9 in such a manner that the characters are written on the record paper 10, likewise as line strokes.

Figure 3:
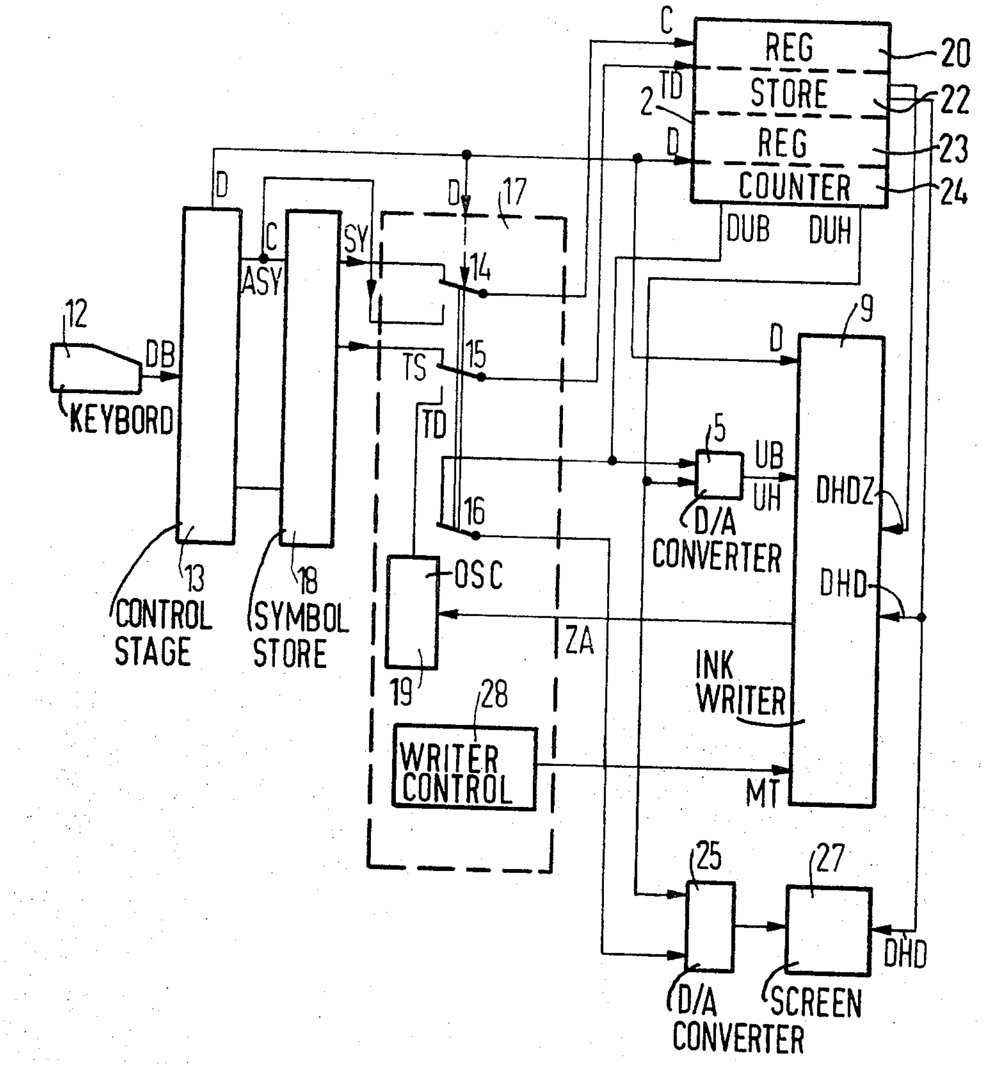
FIG. 3 is a schematic diagram of an embodiment of the invention.

With the aid of an exemplary embodiment of the present invention which is represented in FIG. 3, the invention will be set forth in fuller detail. To a data viewing device, which is constructed as described above, there is connected an ink jet printer 9. The signal exchange between the viewing device and the printer 9 is as follows. The viewing device includes a keyboard 12 which transmits a printing command DB to a viewing device control 13. The viewing device control 13 thereupon sends a signal D for printing on the printer 9. Simultaneously the signal D is employed to actuate a plurality of switches, 14, 15, 16 in the printer adaptation apparatus 17 in order to switch over from the synchronous output SY of a transit time memory 18 to the asynchronous output ASY. Simultaneously a transfer is effected from the beat (clock pulses) TS of the data viewing apparatus to a slower printing beat TD.

When the printer 9 is ready for operation, it generates and delivers a line beginning report signal ZA to turn on a character beat generator which operates to provide the slower printing beat TD. In response to the turning on of the character beat generator the characters to be printed are delivered assynchronously from the transit time memory 18. The reading cycle in the transit time memory 18 takes place as in the data viewing device — i.e., the characters are available at the latest after the access time of the transit time memory 18. The character to be printed is entered in coded form C into the synchronous register 20 of the image generator 2. From there a character C, just as in the data viewing device, but in the frequency of the slower printing beat TD, is further processed. The synchronous generator register 20 of the image generator 2 acts, in this case of operation, as a buffer store. While the digital signals DUH, DUB, DHDZ which characterize the beam movement are supplied to the printer 9, the following character is already being entered into the synchronous register 20 of the image generator 2. Thereby, an uncertainty in the time sequence of characters caused by the access time of the transit time memory 18 is avoided and it is provided that the printed characters of the individual lines are written correctly in columns one under another.

The receipt of the character from the synchronous register 20 of the image generator 2 into the address register of the fixed value memory 22, the selection of the coordinates from the fixed value memory 22 and the switching forward of the beam position counter 24 takes place with the same digital sequence as in normal viewing apparatus operation, but the slower printing beat TD. Only the first three stages of the beam position counter 24, which is connected to the output side of the difference coordinate registers 23, are evaluated for the printer 9, the state of these stages being characterized by the position of the electron beam inside the character raster. All of the other stages which indicate the line position of the electron beam on the picture screen are of no significance for the ink jet printer 9, since the character position on the record paper 10 is fixed by the mechanical movement of the writing head and by the paper advance. During the printing operation, these stages are set at constant values for the electron beam so that the character that is just being printed appears in the middle of the picture screen. The rest of the picture screen is driven dark during the printing operation. This measure, as well as an additional switch 16 in the printer adaption apparatus 17 which switches off the connection and prevents the acceleration pulses DUB from the digital-analog converter 25 of the viewing device 27 serve to prevent overloading of the picture screen at the slower printing beat TD. The digital signals DUB, DUH, which characterize the magnitudes allocated to the characters to be represented are the beam movement on the picture screen of the cathode ray tube 27, are supplied by way of the digital-analog converter 5 and amplified in the form of holding voltages UH and acceleration voltages UB, and are supplied to the deflecting plates 7 of the ink jet printer 9. In the printer adaptation apparatus 17 there is further provided a means 28 with which the motor beat MT of the writing carriage drive is derived from the synchronous counter state of the transit time memory control 18. In order to improve the quality of the script provided by the ink jet printer 9, the fixed value memory 22 of the data viewing apparatus is extended. The fixed value memory 22 now issues an additional bit DHDZ for the light and dark control of the ink jet 11. Therefore, various parts of a character are doubly written, or beginning and end points of partial strokes are written more clearly during the printing operation.

Since the ink droplets 11 emerge continuously from the nozzle 3 (FIG. 2) and cannot be braked, the ink jet 11 must be deflected in the case of a non-cohesive writing sequence within a character, as well as in the transition to the next character, abruptly downward to a turn-away plate. In the process individual droplets go past onto unwritten places of the paper. For this reason, the present invention provides that the individual characters are written in a favorable direction of rotation, i.e., the individual characters are written in such a way that as little as possible partial strokes have to be scanned dark. The number of lost droplets is minimized in this manner, whereby there is achieved a better quality of the graphic image.

Although we have illustrated and described our invention through the utilization of an exemplary embodiment thereof, many changes and modifications thereof may become apparent to those skilled in the art without departing from the spirit and scope of our invention, and it is to be understood that we intend to include within the patent warranted hereon all such changes and modifications as may reasonably and properly be included within the scope of our contribution to the art.

What we claim is:

1. In an arrangement for illustrating symbols on the picture screen of a cathode ray tube, of the type wherein a symbol generator receives digital data signals representing symbols and provides corresponding analog representations of the symbols to be applied to the cathode ray tube via digital to analog converter apparatus at a rate determined by the repetitive pulses of a first pulse source applied to a timing pulse input of said symbol generator, the improvement of means for controlling a jet ink recorder to record the symbols, said means comprising a second pulse source periodically emitting pulses at a frequency which is less than that of the pulses provided by the first pulse source, a second digital to analog converter connected to receive said digital data signals, said second digital to analog converter connected between said symbol generator and the jet ink recorder, and a switch having a first contact connected to the first pulse source, a second contact connected to said second pulse source and a third contact movable between said first and second contacts and connected to the timing pulse input of the symbol generator and operable to cause said symbol generator to transfer the digital data generated thereby to said second digital to analog converter at the rate determined by said second pulse for slower speed jet ink recording of the symbols.

* * * * *